Jan. 6, 1970   R. D. BORGESON   3,487,750
POSITIONING SYSTEM HAVING INPUT SIGNAL INTEGRATOR
AND LOAD PRESSURE FEEDBACK
Filed Dec. 1, 1967   4 Sheets-Sheet 1

FIG. 1

INVENTOR
ROGER D. BORGESON
BY Nilsson + Robbins
ATTORNEYS

Fig. 2

United States Patent Office 3,487,750
Patented Jan. 6, 1970

3,487,750
POSITIONING SYSTEM HAVING INPUT SIGNAL INTEGRATOR AND LOAD PRESSURE FEEDBACK
Roger D. Borgeson, Granada Hills, Calif., assignor to Bell Aerospace Corporation, a corporation of Delaware
Filed Dec. 1, 1967, Ser. No. 687,250
Int. Cl. F15b 9/09, 9/03, 11/08
U.S. Cl. 91—363
16 Claims

ABSTRACT OF THE DISCLOSURE

Disclosed is a hydraeric system for positioning a load according to an input signal. The term "hydraeric" as used throughout the specification and claims is generic to both liquids and gases under pressure and is intended to include hydraulics and pneumatics. The system may include an electro-hydraulic servo valve which produces an output signal responsive to application of an input signal. The output signal is applied to a mechanical integrator apparatus which in response thereto positions a control valve. The control valve controls the flow of fluid under pressure from a source thereof to an actuator which in turn is connected to the load. As the actuator is positioned, a position feedback signal is generated and applied to the servo valve and to the control valve to counteract the applied input signal and the mechanical integrator and thereby null the system when the load is properly positioned. Also disclosed is a pressure sensing apparatus connected across the actuator to provide positive and negative feedback signals for dynamically stabilizing the load in its desired position.

Background of the invention

It has long been desirable to maintain an actuator and the load connected thereto dynamically and statically stable under varying load conditions, both dynamic and static. Such becomes particularly crucial when the load is one of relatively large mass or when the force gain of the servo system is low or when the servo structural attach point is compliant. Numerous attempts have been made in the past to stabilize the load and/or the actuator.

Under static load conditions it has in the past always been the case that a position error was present in the load since the actuator first moved responsive to a force generated by the static load and thereafter the system applied a fluid pressure force to an appropriate part of the actuator to equalize the static load. As a result thereof, the amount of movement of the actuator prior to the equalizing force being applied constituted a position error. That is, the stiffness of the system in the presence of a static load applied to the actuator is finite and is dependent upon the force gain of the servo system. As a result it has not been feasible to use low force gain systems, such as typical pneumatic systems, for accurate position control in the presence of significant loads.

From the foregoing it can also be seen that a particular system static stiffness is directly reliant upon the pressure gain present in the system to equalize the force generated by the static load. Since the pressure gain plays a part in the direct amount of position error which is realized, it also follows that in prior art systems variations in supply pressure and the actual loop gain of the system would also affect the static stiffness of the system.

It is also obviously desirable to maintain the load position without error in that position. With prior art systems having less than infinite static stiffness, it obviously follows that it is impossible to maintain load position without some position error therein.

Any system where accuracy of load position is important must have good dynamic load damping. Many prior art systems have been constructed to meet this problem and with considerable success. For example, systems such as those disclosed in U.S. Patents 3,042,005 and 3,064,- 627. As can be seen, for the most part these prior art systems employ derivative load pressure feedback for dynamic load damping. The basic reason for such is that load pressure feedback often results in reduction of the static stiffness of the system. It has been discovered that an integrating apparatus properly positioned in the system provides the desired stability under static load conditions. Electronic integrating circuits such as integrating amplifiers are well known in the prior art and are used for many purposes. However, such systems are relatively delicate when compared to mechanical and hydraeric systems or combinations of mechanical and hydraeric systems. The electronic systems are particularly affected by heat, vibration, shock and the like, as well as requiring highly sophisticated maintenance, repair, and adjustment techniques to maintain operability of the systems.

Objects of the invention

Accordingly, it is an object of the present invention to provide a control system which may utilize both hydraulic and pneumatic fluids under pressure (hydraeric fluids) and which employs a mechanical-hydraeric integrator means therein and which exerts substantially infinite stiffness in response to a static load applied thereto, and more particularly which may be utilized to maintain the load in the desired position without load position error, thereby greatly enhancing the overall reliability of the control system.

It is another object of the present invention to provide a control system which provides excellent load damping characteristics responsive to dynamic forces applied to the load thus providing a more stable load position under dynamic as well as static operating conditions than was capable with prior art systems.

It is still another object of the present invention to provide a system which is capable of utilizing negative load pressure feedback to accomplish dynamic load damping without reduction of system static stiffness.

It is a further object of the present invention to provide a control system which is capable of maintaining static stiffness independent of system loop gain, system supply pressure variations and system pressure gain.

It is still another object of the present invention to provide a system which is capable of utilizing positive load pressure feedback to minimize positioning error caused by structural compliances external to the servo loop.

Summary of the invention

A load positioning apparatus constructed in accordance with the present invention includes an actuator which is adapted to position a load in response to the flow of fluid under pressure through a control valve from a source thereof to the actuator. An integrator means is provided and a signal responsive means is also provided and is utilized to supply fluid under pressure to the integrator in response to signals applied to the signal responsive means. Summing means is connected between the actuator, control valve and the integrator to position the control valve proportional to the algebraic sum of the positions of the actuator and the integrator means, thereby to position the load.

Brief description of the drawings

Additional objects and advantages of the present invention will become apparent from a consideration of the following description taken in conjunction with the accompanying drawings which are presented by way of example only and are not intended as a limitation upon the scope of the present invention as defined in the appended claims and in which:

FIGURE 1 is a schematic representation of a load positioning system embodying an integrating apparatus in accordance with the present invention;

FIGURE 3 is a set of curves illustrating static stiffness of a load positioning system;

FIGURE 3A is prior art and FIGURES 3B and C are of systems similar to those illustrated in FIGURES 1, and 2, respectively;

Description of the FIGURE 1 embodiment

Referring now to the drawings and more particularly to FIGURE 1, there is schematically illustrated a positioning system in accordance with the present invention which embodies an integrator apparatus therein. As is schematically illustrated, a load 10 is positioned by an actuator 20 the position of which in turn is controlled by displacement of point 80 on summing link 100 as is well known in the art. The position of point 80 on summing link 100 is in turn controlled by a signal receiving mechanism such as an electro-hydraeric servo valve 40, the operation of which positions a hydraeric amplifier 50, the flow through which is applied to an integrator apparatus 60. The position of the integrator apparatus 60 in turn is fed forward to position the control valve 30 through mechanical linkage means as illustrated.

In greater detail, the load 10 is connected to a body 12 of the actuator 20, as illustrated by the dashed line 11. The body 12 defines a cylinder 13 within which there is positioned a slidable piston 14 which divides the cylinder 13 into chambers 15 and 16. A rod 17 is connected to the slidable piston 14 and is pivotally connected to an anchoring lug 18 which is fixed in position as is illustrated by the ground symbol 19. A conduit 21 connects the chamber 15 to system fluid pressure source P or system fluid return R depending upon the position of the control valve 30 while a conduit 22 similarly connects the chamber 16.

The control valve 30 includes a body 31 which is fixed as shown by the ground symbol 31' and which defines a cylinder 32 within which there is slidably positioned a spool valve 33 having lands 34, 35 and 36 which are interconnected as illustrated. The lands 34 and 35 define between them a chamber 37 within the cylinder 32 while the lands 34 and 36 define between them a chamber 38 within the cylinder 32. A rod 39 is connected between the spool valve 33 and a summing link 100 of a mechanical linkage at the pivot point 101. The summing link 100 is pivotally connected at the pivot point 102 to the body 12 of the actuator 20 as illustrated.

The electro-hydraeric servo valve 40 includes a torque motor having an armature 41 having a mechanical signal input at point 105 and a coil 42 positioned thereabout and defining input terminals 43 to which electrical signals are applied. The electrical and mechanical signals produce torques which cause the armature to pivot about its pivot point 44. Connected to one end of the armature 41 is a flapper 45 which moves responsive to the movement of the armature 41. The flapper 45 is positioned between a pair of nozzles 46, 47 which are connected to the system fluid pressure source as illustrated at P by means of conduits 48 and 49 which respectively define restriction orifices 51 and 52 as well known in the prior art. A pair of conduits 53 and 54 are connected respectively from nozzles 46 and 47 to opposite ends of the hydraeric amplifier 50 as illustrated. Although a flapper-nozzle type apparatus has been herein disclosed, it should be expressly understood that any input signal receiving apparatus may be used, such as a jet pipe or mechanical linkage means.

Figure 2:
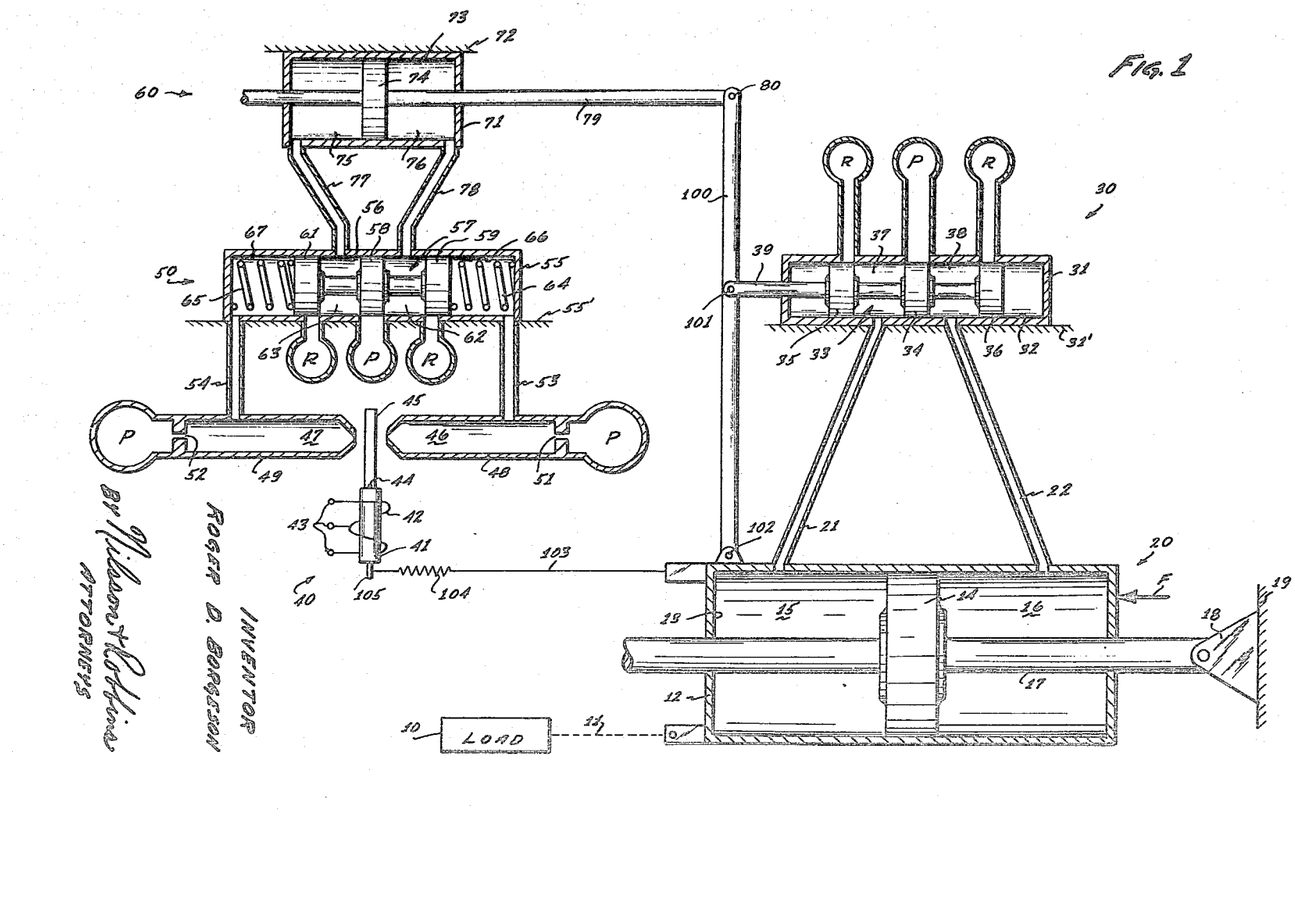
FIGURE 2 is a schematic representation of a load positioning system involving both an integrating apparatus and a pressure responsive apparatus in accordance with the present invention.

The hydraeric amplifier 50 includes a body 55 which is fixed as shown by the ground symbol 55' and which defines a spool valve 57. The spool valve 57 defines lands 58, 59 and 61. The lands 58 and 59 define between them a chamber 62 while the lands 58 and 61 define between them a chamber 63. As can also be seen, the spool valve 57 is maintained under quiescent conditions in a centered or null position as illustrated by the spring means 64 and 65 which are disposed respectively within the end chambers 66 and 67 of the cylinder 56. When the spool valve 57 is centered in its quiescent position as illustrated in FIGURE 2, it should be noted that land 58 blocks communication of fluid pressure from the system source P to the cylinder 56 while lands 59 and 61 each block the cylinder 56 communication with the system return R. The combination of the torque motor, flapper-nozzles and amplifier function to provide a hydraeric output signal responsive to application of an input signal to the armature of the torque motor. This signal is then applied as an input signal to the integrator 60.

The integrator means 60 includes a body portion 71 which is fixed as is illustrated by the ground symbol 72. The body 71 defines a cylinder 73 within which there is slidably disposed a piston 74 which divides the cylinder 73 into chambers 75 and 76. A conduit 77 causes the chamber 75 to be in communication with the chamber 63 and thereby with system pressure or return depending upon the position of the spool valve 57 while a conduit 78 similarly causes communication between the chamber 76 and system pressure or return through the chamber 62. A piston rod 79 is connected between the piston 74 and a pivot point 80 of the summing link 100.

It can thus be seen as the piston 74 moves, the summing link 100 is caused to move and its movement in turn positions the control valve 30 so as to cause the actuator body 12 also to move. As the body 12 moves, a feedback signal proportional to this movement is applied along the mechanical connection 103 and the spring 104 to the top portion 105 of the armature 41, and a feedback signal is applied through pivot point 102 to summing link 100.

Operation, FIGURE 1

For purposes of description of the operation of the system as shown in FIGURE 1, it will be assumed that an electrical signal is applied to terminals 43 of such a nature as to cause the armature and flapper to rotate clockwise (as viewed in FIGURE 1) about the pivot point 44 thereof. Such rotation moves the flapper 45 closer to the orifice of the nozzle 46 and away from the orifice of the nozzle 47. Under these conditions, the pressure at the nozzle 46 increases and the pressure at the nozzle 47 decreases. The increased pressure is transmitted through the conduit 53 to the chamber 66 and the decreased pressure appears in chamber 67 through the conduit 54. Under these conditions, the spool valve 57 moves toward the left (as viewed in FIGURE 1). As the spool valve 57 moves toward the left, the land 58 opens the chamber 62 to the system fluid pressure source P while the land 61 opens the chamber 63 to system return R. The fluid under pressure then flows from the source P through the chamber 62 and the conduit 78 into the chamber 76 of the integrator 60 and system return R is connected to the chamber 75. Such flow causes pressure to build up in the chamber 76 as compared to the chamber 75 and thereby the piston 74 moves toward the left carrying with it the rod 79. The piston 74 continues to move so long as the hydraeric signal is applied thereto and the rate of the movement is proportional to the amplitude of the hydraeric signal applied thereto. Through the linkages and pivot points above mentioned movement of the rod 79 causes the summing link 100 to move toward the left or in a counterclockwise direction about its pivot point 102. This movement through the connection with the rod 39 causes the spool valve 33 of the control valve 30 to move toward the left.

This movement of the spool valve 33 causes the land 34 to uncover the source P of the system fluid pressure and connect it to the chamber 38. At the same time, movement of the land 35 uncovers system return and connects it to the chamber 37. Such action of the spool valve 33 thus connects the system fluid pressure source P through the conduit 22 to the chamber 16 of the actuator 20 and system return R is connected through the conduit 21 to the chamber 15 of the actuator 20.

Since the rod 17 is fixed, the body 12 moves toward the right (as viewed in FIGURE 1) thereby to position the load 10 as commanded. As the body 12 moves toward the right, the summing link 100 has its pivot point 102 also moved toward the right, which movement operates as a negative feedback signal and tends to return the spool valve 33 toward its null position as illustrated in FIGURE 1. At the same time the movement toward the right of the body 12 not only moves the load 10 and the pivot point 102 but also applies a feedback signal through the mechanical connection 103 and spring 104 to the top portion 105 of the armature 41. This mechanical motion or force applies a force to the armature 41 such as to cause it to rotate in a counterclockwise direction which tends to return the flapper 45 towards its neutral or null position as shown in FIGURE 1 (i.e. a negative feedback signal). When the flapper 45 reaches its neutral or null position as illustrated, the pressures in the nozzles 46 and 47 are balanced and the spool valve 57 returns to its null position as illustrated, blocking the system fluid pressure source P and removing the signal from the integrator 60 thus causing it to cease movement. When the integrator piston 74 ceases movement and the control valve 30 has the spool valve 33 in its null position, the actuator has reached the commanded position and remains there until there is a change in signal which causes the flapper 45 to again move. Such change in signal could be of course a variation in the electrical signal applied to the contacts 43 or a removal of all signals therefrom.

It would, of course, be obvious that if the electrical signal applied to the contacts 43 were of opposite polarity, the flapper would rotate in the opposite direction about the pivot point 44 and the description of the foregoing operation would be the same except for the movement of the various portions of the system being in the opposite direction.

Assume now that the body 12 has asumed the position required by the command signal applied to contacts 43 as above described and is in a stationary condition insofar as such a signal is concerned. However, also assume that an external static load is applied as shown by the arrow F such that it tends to move the body 12 from right to left as viewed in FIGURE 1. As a result of the compliance in the system, this external force F tends to cause the actuator body to move toward the left and as a result of this tendency the following sequence occurs in the operation of the system in accordance with the present invention.

The movement of the body 12 toward the left causes movement of the summing link 100 about the pivot point 80 such that the spool valve 33 is moved toward the left as viewed in FIGURE 1. Such movement toward the left immediately causes the land 34 to uncover the system fluid pressure source P and connect it to the chamber 38 while simultaneously having the land 35 connect the system return R to the chamber 37. As above pointed out, this then connects the system fluid pressure to the chamber 16 and return to chamber 15 which causes pressure to build up in chamber 16 to compensate for the force F externally applied. As above pointed out, however, this alone would cause some position error since it would require actual movement of the piston 14 with respect to the body 12 to apply the system fluid pressure to the actuator to compensate for external load. However, such position error is compensated for in the present system.

Such is accomplished as a result of the integrator 60 and its operation in connection with the remainder of the system. As the body 12 moves toward the left, such movement is connected through the mechanical feedback 103 and spring 104 to the armature 41. The particular movement as assumed causes pivoting of the armature about the point 44 such as to move the flapper 45 closer to the nozzle 46. Such operation as above described applies fluid under pressure through the conduit 78 from the source P and through the chamber 62 to the chamber 76 of the integrator 60 while connecting the chamber 75 to return R as above described. Such causes movement of the piston 74 and in turn through the rod 79 causes the summing link 100 to move toward the left about the point 102. This movement causes the spool valve 33 to be offset from its null position by an amount sufficient to maintain system fluid pressure source P connected through the chamber 38 and the conduit 22, to the chamber 16 of the actuator thereby to cause movement of the body 12 with respect to the piston 14 back to the original commanded position and to hold that position against the load. Under these circumstances, the flapper 45 is again in a null position with respect to the nozzles 46 and 47 and no signal is applied to the integrator 60. Thus it can be seen that the actuator 20 is caused to return to and remain at the commanded position with no position error even under the application of an applied external force F. Therefore, it can further be seen that insofar as a static load condition is concerned, that is, when a given force is applied to the actuator 20 the system exerts a substantially infinite stiffness with respect thereto. That is, there is no position error in the position of the actuator as a result of the static load applied thereto.

Again, it should be understood expressly that if the load or external force F were applied in the opposite direction, causing the body 12 to move from left to right as viewed in FIGURE 1, the operation of the system would be exactly the same as that above described but with movement of each of the component parts in the direction opposite to that as above described.

The embodiment of FIGURE 2

In many instances it is desirable to have the position of the load maintained stable irrespective of the application of static or dynamic loads thereto. Under such conditions, a system similar to that illustrated in FIGURE 2 may be employed.

Referring now particularly to FIGURE 2, there is illustrated schematically a system employing the hydraeric mechanical integrator and in addition thereto a load pressure responsive apparatus connected across the actuator for the purpose of sensing loads that may be applied to the apparatus and for providing certain feedback signals to stabilize the load in the presence of both dynamic and static load conditions. As is shown in FIGURE 2, the system comprises a signal receiving means 110 which as illustrated is a torque motor nozzle-flapper combination, the output of which is in this instance directly fed to the mechanical-hydraeric integrator means 120. Movement of the integrator means 120 in turn controls the position of actuator 140 by means of summing link 127 and control valve 130. The control valve 130 as was the case above, controls the application of hydraeric power from the system source P thereof to an actuator 140 which in turn positions the load 150. Positioned across the actuator 140 is a pressure sensing device 160 which provides feedback signals for purposes of stabilizing the load 150 insofar as both dynamic and static loads applied thereto are concerned.

The signal receiving portion of the apparatus as disclosed in FIGURE 2 includes an electronic amplifier 111 the output of which is applied to the coils 112 about the armature 113 of the torque motor. Movement of the armature 113 also moves the flapper 114, as a result of pivoting of this combination about the pivot point 115, with respect to the nozzles 116 and 117, as was above described in some detail. The conduits 118 and 119 connect the output of the flapper-nozzle stage directly to the integrator 120.

As is illustrated, the integrator 120 includes a cylinder 121 having a piston 122 slidably disposed therein and separating the cylinder into chambers 123 and 124. A piston rod 125 is connected to the piston 122 and is connected at the opposite end thereof at the pivot point 126 to the summing link 127. The opposite end of the summing link at the pivot point 128 is connected to the rod 129 which in turn is connected to one end of the spool valve 131.

The spool valve 131 of the control valve 130 is disposed within a cylinder 132. The spool valve consists of lands 133, 134 and 135 interconnected as is well known in the art. The lands 133 and 134 define a chamber 136 within the cylinder 132 while the lands 133 and 135 define a chamber 137 within the cylinder 132. Conduits 138 and 139 interconnect the chambers 136 and 137 respectively to the actuator 140.

The actuator 140 consists of a cylinder 141 having a piston 142 slidably disposed therein and separting the cylinder 141 into chambers 143 and 144. A rod 145 is connected through a spring 150' which represents the compliance of the load, to the load 150. The opposite end of the rod 145' is connected at a pivot point 146 to an arm 147 which constitutes a portion of the mechanical linkage. The opposite end of the arm 147 is connected at the pivot point 148 to the summing link 127. The pivot point 148, it should be noted, is disposed between the pivot points 126 and 128 which are connected between the integrator 120 and the control valve 130.

The load pressure responsive feedback apparatus 160 includes a cylinder 161 within which there is disposed a slidable piston 162 which separates the cylinder 161 into chambers 163 and 164. The piston 162 is maintained in its quiescent position, in the absence of any pressure differential across the actuator 140, by means of springs 165 and 166 positioned respectively within the chambers 163 and 164. The chamber 163 is connected to the chamber 143 of the actuator 140 by means of the conduit 167 while the chamber 164 is connected to the chamber 144 of the actuator 140 by the conduit 168. Pressure differential occurring across the actuator piston in the chambers 143 and 144 are thus impressed across the piston 162 to cause the same to move within the cylinder 161. Movements of the piston 162 are coupled by way of the rod 169 to the pivot point 170 disposed between the ends of the arm 147.

The position of the actuator 140 is fed back through the mechanical position to electrical signal transducer 180 which is represented schematically as a resistance element 181 connected to a source of potential 182 and having a wiper arm 183 movable with the rod 145–145' so as to cause a variable electrical signal, proportional to the position of the actuator 140, to be applied along the electrically conductive lead 184 to the terminal 185 of the amplifier 111. It should be noted by the polarity sign (−) that the position feedback signal from the actuator is a negative feedback signal. It should also be expressly understood that this negative feedback signal may be a mechanical feedback signal connected from the actuator to the armature 113 as was illustrated and described with respect to FIGURE 1, a signal generated by a linear variable differential transducer (LVDT). A similar mechanical position to electrical signal transducer 190 represented as a resistance element 191 connected to a source of potential 192 and having a wiper arm 193 which is connected to the rod 169 provides an electrical feedback signal which is representative of the movements of the piston 162 along the electrically conductive lead 194 to the input terminal 195 of the amplifier 111. It should be here noted that this feedback signal from the pressure sensitive sensing apparatus 160 is a positive feedback signal as is noted by the polarity sign (+). It should also be understood that the electrical position feedback signal applied to the terminal 195 may also be a mechanical feedback signal coupled directly to the armature 113 as above described and referred to or LVDT. An additional terminal 196 is also provided for the amplifier 111 and it is to this terminal that input command signals are applied.

It will be understood by those skilled in the art that the mechanical linkage illustrated in FIGURE 2 mechanically sums the positions of the integrator 120, the pressure feedback apparatus 160 and the actuator 140 to position the control valve 130 proportionally to the algebraic sum of the positions of the integrator, pressure sensing piston, and actuator. The flapper 114 is, of course, positioned responsive to the sums of the command signals and the negative and positive feedback signals applied to the amplifier 111.

Operation, FIGURE 2

For purposes of discussion of the operation of this embodiment, it will be assumed that an input signal is applied to terminal 196 by way of a command such that it causes the armature-flapper 113, 114 to rotate about its pivot point 115 in a clockwise direction. Under these circumstances, the flapper 114 moves closer to the nozzle 116 thus causing a pressure buildup in chamber 123 and pressure decrease in chamber 124 of the integrator 120. The pressure and/or flow differential in the chambers 123–124 causes the piston 122 to move toward the right as viewed in FIGURE 2. Movement toward the right (since the arm 147 remains stationary at this point) causes the summing link 127 to pivot about the pivot point 148 in such a way as to move the spool valve 131 toward the left. Movement of the spool valve 131 toward the left causes the land 133 to open communication from the source P of fluid under pressure to the chamber 137 and to cause the system return R to communicate with the chamber 136. Therefore, fluid under pressure flows through the conduit 139 to the chamber 144 of the actuator and system return R is connected to chamber 143 thereby causing the piston 142 to move toward the left.

As the actuator moves toward the left, it will be noted that the pivot point 146 also moves toward the left causing the arm 147 to be carried toward the left and to pivot about pivot point 170 thus moving the pivot point 148 to the right. The movement of the pivot point 148 to the right tends to return the spool valve 131 toward its null position as illustrated. Simultaneously with the movement, a position feedback signal which is negative is applied to the terminal 185 of the amplifier 111 from the actuator position transducer 180 to cause the flapper 114 to return toward a null position. Also simultaneously, since there is a pressure buildup in chamber 144 with respect to chamber 143 of the actuator, a similar pressure differential is impressed across the piston 162. The piston 162, responsive thereto, moves toward the right causing the pivot point 170 also to move toward the right and again aiding in returning the spool valve 131 toward the null position. The spool valve 131 returns to the null position when the actuator has moved to the commanded position and thereby has placed the load in the position which is called for by the command signal.

Similar to the operation as discussed with respect to FIGURE 1, if a force is applied of a static nature to the actuator 140, the integrator 120 operates to return the actuator to the desired and commanded position. Such occurs in the following way: Assume now that a force is applied as shown by the arrow F to the load 150 which tends to move the load and the piston 142 of the actuator toward the left. This causes the pivot point 146 to be moved toward the left and for the moment, assuming the pivot point 170 remained stationary, the pivot point 148 is moved toward the right causing the spool valve 131 to be moved toward the right. Such movement causes the source P of system fluid pressure to be communicated through the chamber 136 and the conduit 138 to the chamber 143 to resist the force F which had been applied. At the same time, the movement of the actuator 142 provides a position feedback signal from the transducer 180 to the terminal 185 and the amplifier 111 which causes the flapper 114 to move closer to the nozzle 117 thus building up pressure in the chamber 124 of the integrator 120. Such buildup of pressure moves the rod 125 and the pivot point 126 of the summing link 127 toward the left thus maintaining the source P of fluid under pressure in communication with the chamber 143 and the actuator 140 until the actuator piston 142 is returned to the commanded position, at which point the flapper 114 is again in its null position and the integrator piston 122 ceases moving and the control valve 130 is offset from null position. It will be noted also that the differential pressure appearing across the piston 142 again appears across the piston 162. In this instance the pressure being higher in the chamber 143 causes the pressure to be higher in the chamber 163 of the pressure sensing apparatus 160. Such causes the piston 162 to move toward the left as viewed in FIGURE 2, thereby tending to operate as a negative load pressure feedback signal in the mechanical linkage summing apparatus which in turn tends to cause the spool valve 131 to move away from its null position. This results in an inner loop force gain reduction which is washed out by the integrator.

In those instances wherein it is desired to have the load 150 in a substantially infinite static stiffness condition, the positive feedback signal applied at the terminal 195 of the amplifier 111 from the pressure sensing piston 162 provides the signal which causes the application of fluid under pressure to the actuator 140 to cause the actuator piston 142 to assume a position such as to cause the load (as opposed to the actuator) to be in a commanded position. The position of the actuator will be different from that commanded by an amount sufficient to compensate for the spring constant of the spring 150'. This spring constant is the compliance of the load itself and can be calculated in any given application.

Assuming now that the actuator 140 has a steady state uni-directional load only applied thereto, it can be seen that such pressure differential appearing across the piston 142 is immediately impressed across the piston 162, causing it to move responsively thereto. As above pointed out, assuming that the pressure is higher in chamber 163 than in chamber 164, the piston 162 moves toward the left causing the spool valve 131 to apply fluid under pressure to chamber 144 of the actuator to compensate for any increased pressure in chamber 143. Simultaneously chamber 143 is connected to system return. At the same point in time, the position transducer 190 provides a positive feedback signal to cause the flapper 114 to move closer to the nozzle 116 thereby causing the integrator piston to move toward the right and again to move the spool valve 131 toward the left, thus causing fluid under pressure to move the actuator 142 to the commanded or desired position from which it had originally varied as a result of the steady state uni-directional load applied thereacross. As above pointed out, this desired position may also compensate for the spring constant of the spring 150' if such is desired.

The operation of the system as above described will, of course, be precisely the same but with opposite movements in the event that the signals applied thereto are of opposite polarity or direction as the case may be. It should also be understood that although each movement of the various portions of the circuit have been described individually, such will in fact occur together so as to provide a smooth, even operation to maintain the position of the load 150 as desired and as commanded.

Figures 3, 3A:
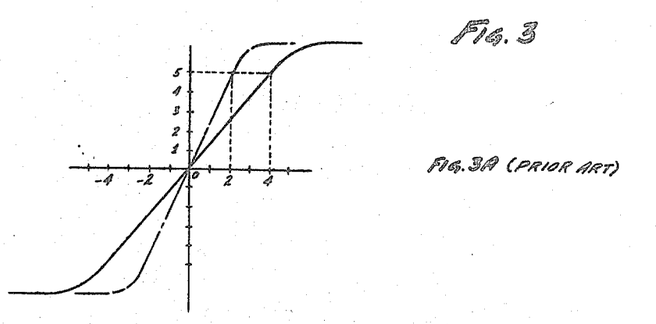
Figure 3B:
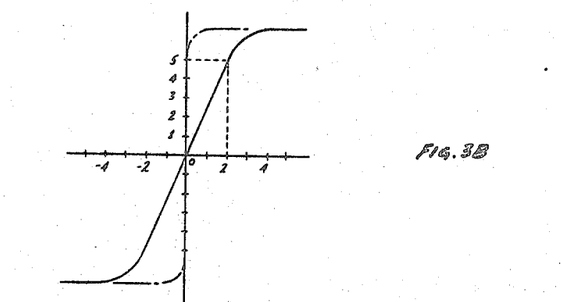
Figure 3C:
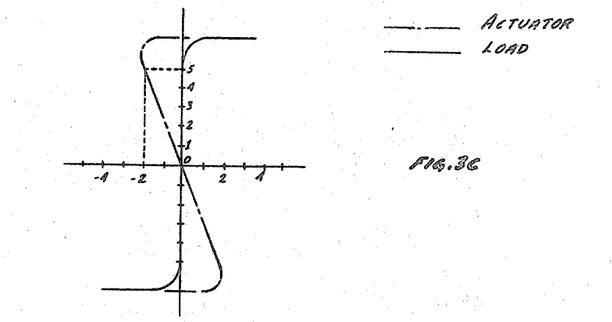

Referring now to FIGURE 3, the characteristics of the system as above described with respect to FIGURES 2 and 3, is illustrated as compared to a prior art system not incorporating the integrator or the pressure responsive feedback device. As is illustrated in FIGURE 3, displacement is plotted along the abscissa and force is plotted along the ordinate of the curves. Displacement is the position of the actuator (the broken lines) or the load (solid lines) to the left or the right from a neutral position which is indicated as zero for the abscissa. The force is a force which tends to cause movement toward the left or right of the actuator or the load as the case may be from a neutral or null position which is indicated as zero on the ordinate. The zero in both cases is at the point where the abscissa and the ordinate cross.

With respect to curve A which is representative of prior art type systems, it is noted that when a particular force of five units (the units being arbitrary ones for purposes of this discussion) is applied, the actuator is displaced two units and the load four units (the units in this case for displacement are again arbitrary for purposes of discussion). The difference in the positioning of the actuator and the load is the spring constant of the load, as is illustrated for example in FIGURE 2 by the spring 150'.

Curve B represents a system similar to that in FIGURE 1 having an integrator apparatus according to the present invention. Within the situation such as illustrated at Curve B it will be noted that when a force of 5 units is applied to the system, the actuator does not move but remains at zero displacement. Therefore, a system such as that shown in FIGURE 1 has substantially infinite static stiffness insofar as the actuator position is concerned. It will be noted, however, that the load (shown in solid lines) is displaced approximately 2 units. Again this is the compliance of the load (the spring constant of the load) as above described.

Referring now to Curve C, it will be noted that in this instance when a force of approximately 5 units is applied to the system, the actuator shows a negative position; that is, it is moved approximately 2 units toward the left for a force of 5 units of the type which normally should cause it to move in a positive direction under prior art circumstances. Such movement toward the left maintains the load (shown in solid lines) so that there is zero movement in response to the 5 units of force applied to the load. In a system of this type, there is substantially infinite static stiffness insofar as the load is concerned, such as above pointed out with respect to the description of FIGURE 2 (which Curve C represents). The positive feedback signal provided by the pressure sensitive apparatus 160 produces a system wherein the load can be said to have substantially infinite static stiffness.

Figures 4, 5:
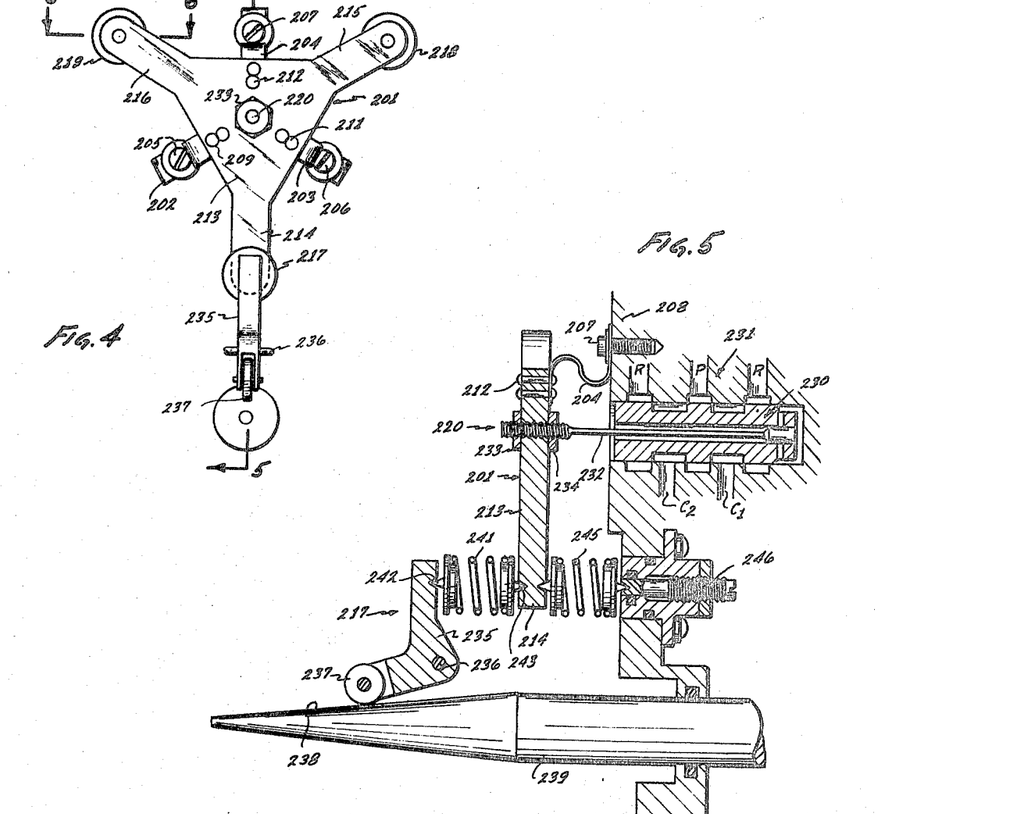
FIGURE 4 is a plan view of one form of a mechanical summing portion of a system constructed in accordance with the present invention.
FIGURE 5 is a partial fragmentary cross-sectional view taken about the line 5—5 of FIGURE 4.
Figure 6:
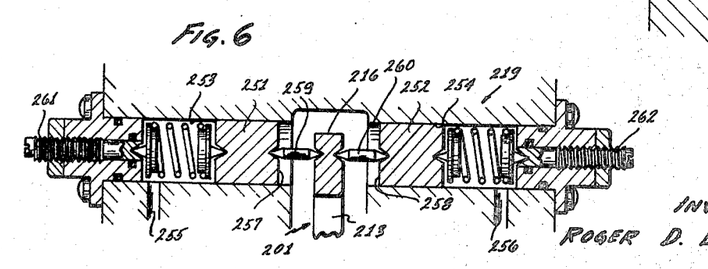
FIGURE 6 is a partial fragmentary cross-sectional view taken about the line 6—6 of FIGURE 4.

Referring now more particularly to FIGURES 4, 5 and 6 there is illustrated one form, for purposes of example only, which an apparatus constructed in accordance with the present invention may take. That portion illustrated in FIGURES 4 through 6 does not include the outer position and pressure feedback loops as exemplified by elements 180 and 190 of FIGURE 2. As is shown throughout FIGURES 4, 5 and 6, there is provided a summing means in the form of a wobble plate 201 which is spring mounted by way of springs 202, 203 and 204 which are attached by way of bolts 205, 206 and 207 respectively to the housing or body 208 of the apparatus. At the opposite side the springs may be attached to the wobble plate by means of the rivets 209, 211 and 212 respectively. The wobble plate includes a body section 213 having three arms 214, 215 and 216 extending radially therefrom and in the particular instance as illustrated, are spaced substantially equi-angularly apart. It should also be noted that the springs 202, 203 and 204 are attached to the body 213 of the woble plate substantially equi-angularly apart and equidistant from the center 220 of the body of the wobble plate 201. The signals for summing are applied to the wobble plate at the ends of each of the arms 214 through 216. For example, a position feedback mechanism appropriately connected to the actuator may be connected to the arm 214 as shown at 217 while the integrator piston assembly may be connected to the arm 215 as shown at 218 and the load pressure sensing apparatus may be connected to the arm 216 as shown at 219. It should also be noted that the point of connection of each of the devices 217 through 219 is substantially equidistant from the center 220 of the wobble plate 201.

The center 220 of the wobble plate is connected to the spool valve 230 of the control valve 231 by means of a rod 232 which is held in place about the center of the wobble plate 201 by means of nuts 233 and 234 as secured to the rod 232.

The actuator position mechanical feedback mechanism for purposes of summing the actuator position for application of the same to the control valve may comprise the crank 235 which is pivoted about a pivot point 236 which may be affixed to the body 208 by any means desired and which includes the roller mechanism 237 which rides upon a tapered portion 238 of the actuator rod 239. At the opposite end of the crank there is positioned a spring 241 which is connected at one end through a contact mechanism 242 to the crank and at the opposite end through a similar contact mechanism 243 to the arm 214 of the wobble plate 201. An additional spring 245 may be connected between the arm 214 and the body 208 and may be positioned adjacent a screw threaded stud or bolt 246 for purposes of establishing a set point when the actuator is at its null or neutral position.

(It will be recognized that the springs 202 and 203 have not been illustrated in FIGURE 5 for purposes of simplicity and clarity of illustration.)

Referring now more specifically to FIGURE 6, a typical arrangement for the load pressure sensing apparatus as well as the integrator apparatus is shown. As is therein illustrated, there is provided a pair of piston members 251 and 252 which are supported within cylinder 253 and 254 respectively. Passageways 255 and 256 communicate with the cylinders 253 and 254 respectively. Thus the differential pressure appearing across the piston in each instance (for example, pistons 122 or 162 in FIGURE 2) appears across the pistons 251, 252 taken as a single unit. The inner portions 257 and 258 of the pistons 251 and 252 respectively are connected by pins 259 and 260 respectively to the arm 216 of the wobble plate. Set screws or bolts 261 and 262 are used to adjust the positions of the pistons 251, 252 at null as would be recognized by those skilled in the art.

From the foregoing, it should become obvious to those skilled in the art that the mechanical input signals applied simultaneously to the three arms 214 through 216 of the wobble plate 201 are automatically summed at the center thereof and this summation of mechanical input is applied to the control valve 231 to cause system pressure P to be applied through one of the passageways or conduits $C_1$ and $C_2$ while system return R is applied through the other to the actuator (not shown in FIGURES 4 through 6).

There has thus been disclosed a control system for positioning a load according to an input signal which provided substantially infinite static stiffness for an actuator and/or a load connected to the actuator as desired for any particular application which may utilize either hydraulic or pneumatic fluids under pressure and which provides excellent load damping characteristics and which may maintain the static stiffness independent of system loop gain variations and supply pressure or pressure gain.

Although several forms of the invention have been illustrated substantially schematically, such is not to be taken as a limitation upon the particular form which the apparatus constructed in accordance with the invention may take. The invention, rather, is to be measured by the claims appended hereto.

What is claimed is:

1. Hydraeric load positioning apparatus comprising:
   (1) an actuator adapted to position a load;
   (2) control valve means adapted to control the flow of fluid under pressure from a source thereof to said actuator;
   (3) integrator means responsive to the application of fluid under pressure thereto;
   (4) signal responsive means adapted to control the application of fluid under pressure from a source thereof to said integrator means in response to signals applied thereto;
   (5) load pressure sensing means for generating a signal proportional to the pressure differential appearing across said actuator; and
   (6) summing means connected between said actuator, said control valve means, said load pressure sensing means, and said integrator means to position said control valve means proportional to the sum of the position of said actuator, said load pressure sensing means, and said integrator means.

2. Load positioning apparatus as defined in claim 1 which further includes feedback means connected between said load pressure sensing means and said signal responsive means for applying to said signal responsive means a positive feedback signal proportional to the pressure difference across said pressure sensing means.

3. Apparatus as defined in claim 1 wherein said summing means is a wobble plate connected at displaced positions to said integrator means, said actuator, and said load pressure sensing means said wobble plate being spring mounted on spring means affixed thereto equidistant from the center thereof and spaced equiangularly thereon.

4. Load positioning apparatus as defined in claim 1 wherein said means for connecting said load pressure sensing means and said summing means is a mechanical linkage.

5. Load positioning apparatus as defined in claim 4 wherein said load pressure sensing means is a spring centered piston slidably positioned within a cylinder defining chambers on opposite sides of said piston, said chambers being connected across said actuator.

6. Load positioning apparatus as defined in claim 1 wherein said integrator means is a mechanical apparatus the position of which changes continuously during the time fluid under pressure is applied thereto and the position change is at a rate proportional to the magnitude of the fluid signal applied thereto.

7. Load positioning apparatus as defined in claim 6 wherein said mechanical apparatus is a piston slidably supported within a cylinder and said signal responsive means includes a torque motor, flapper, and nozzle means, and further includes means connecting said nozzle means to said cylinder.

8. Load positioning apparatus as defined in claim 7 wherein said means connecting said nozzle means to said cylinder is a hydraulic amplifier.

9. Load positioning apparatus as defined in claim 1 wherein said integrator means provides a feed forward signal in response to an input signal to position said actuator and said actuator provides a feedback signal which tends to null said input signal.

10. Hydraeric load positioning apparatus comprising:
    (1) hydraerically responsive integrator means for providing an output signal representative of amplitude and duration of an input hydraeric signal applied thereto;
    (2) means adapted to receive an input signal and responsively thereto to provide a hydraeric output signal operatively connected to said integrator means to apply said hydraeric output signal as the hydraeric input signal to said integrating means;

(3) load positioning means including feedback signal generating means for providing signals representative of load position and load pressure; and (4) means connecting the output signal of said integrator means to said load positioning means including said feedback signals thereby to position said load in accordance with said input signal to said means adapted to receive an input signal.

11. Hydraeric load positioning apparatus as defined in claim 10 wherein said feedback signal generating means includes electrical signal generating means.

12. Hydraeric load positioning apparatus as defined in claim 11 which further includes an electrical amplifier means, said electrical signal generating means being connected to said electrical amplifier means.

13. Hydraeric load positioning apparatus as defined in claim 12 wherein said means adapted to receive an input signal includes a torque motor connected to produce said hydraeric output signal, the output of said electrical amplifier being connected as an input signal to said torque motor and which further includes mechanical linkage means connected between said load positioning means and said integrator means.

14. Hydraeric load positioning apparatus as defined in claim 13 wherein said feedback signal generating means includes a load pressure responsive means connected to said mechanical linkage.

15. Hydraeric load positioning apparatus as defined in claim 14 wherein said electrical signal generating means includes a first mechanical position to electrical signal transducer connected to said load positioning means and a second mechanical position to electrical signal transducer connected to said load pressure responsive means.

16. Hydraeric load positioning apparatus as defined in claim 10 wherein said feedback signal generating means includes mechanical feedback apparatus and said means for interconnecting is a mechanical linkage.

References Cited

UNITED STATES PATENTS

| | | | |
|---|---|---|---|
| 1,199,036 | 9/1916 | Hodgkinson | 91—384 |
| 2,989,950 | 6/1961 | Lockman | 91—388 |
| 3,046,944 | 7/1962 | Dungan et al. | 91—388 |
| 3,093,121 | 6/1963 | Murphy | 91—384 |
| 3,190,185 | 6/1965 | Rasmussen. | |

PAUL E. MASLOUSKY, Primary Examiner

U.S. Cl. X.R.

91—216, 359, 384, 433, 461